UNITED STATES PATENT OFFICE.

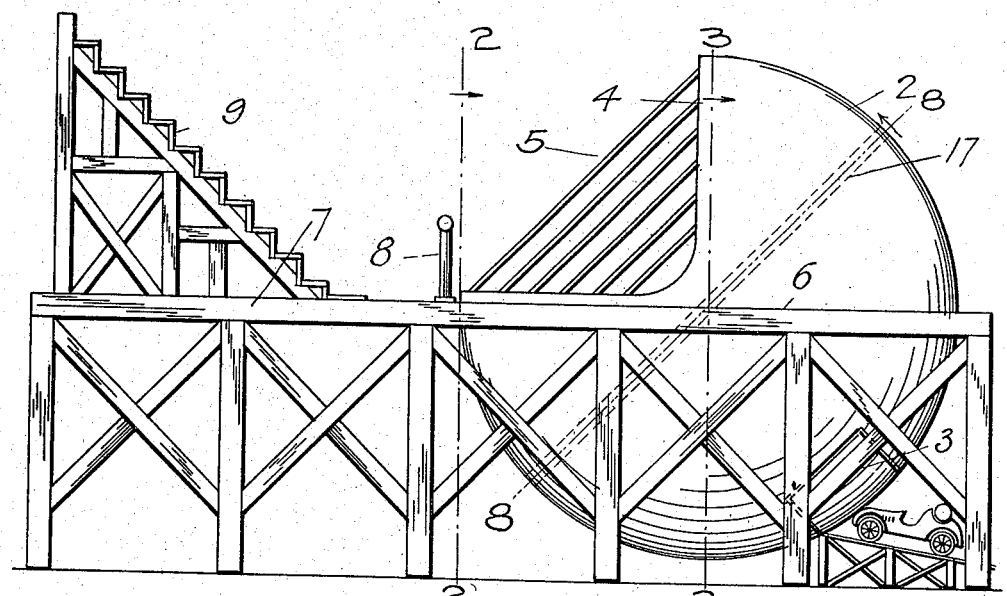
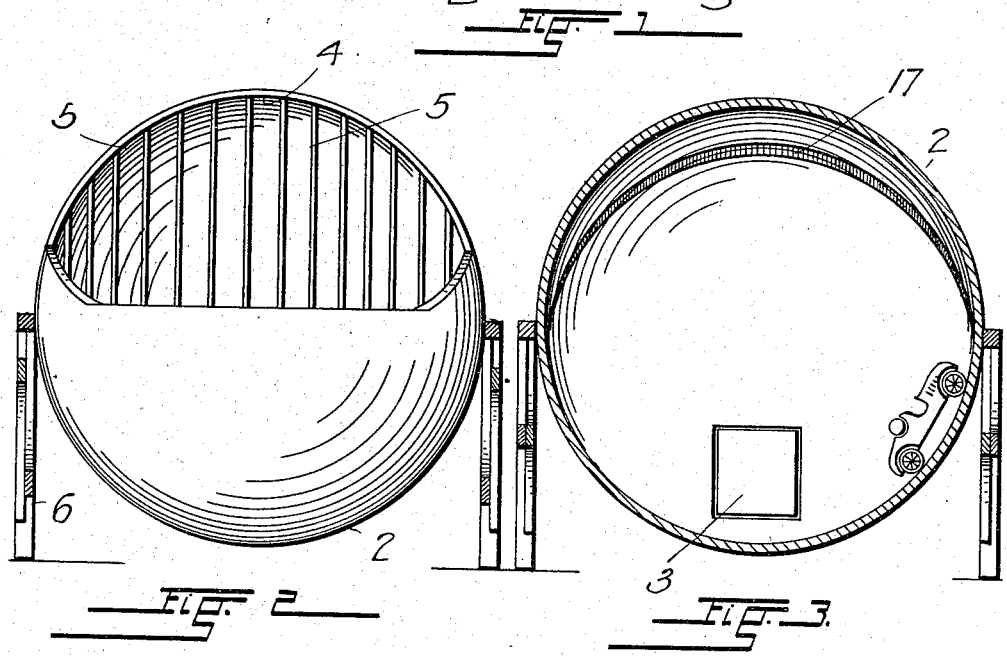

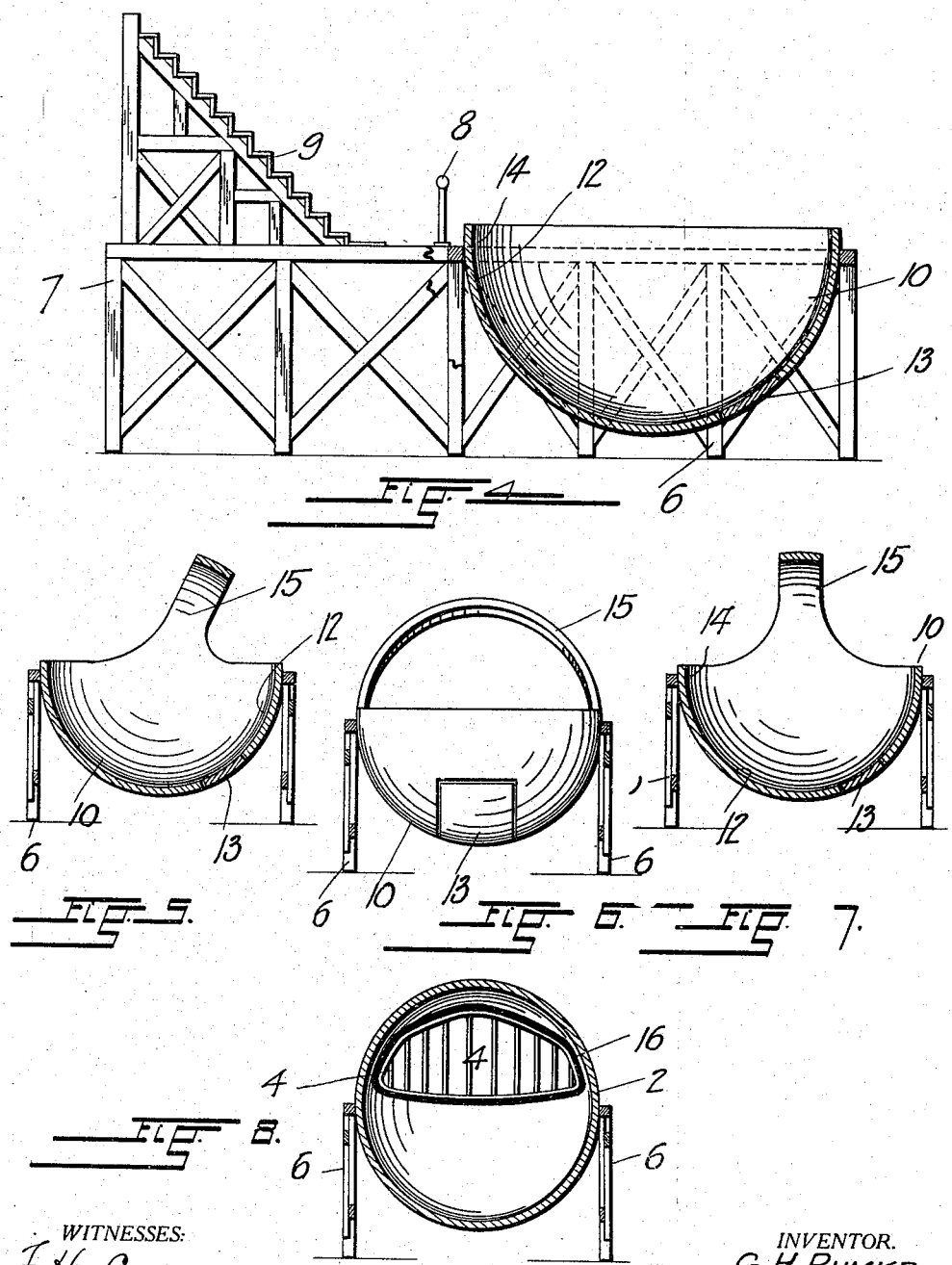

GEORGE H. RUMKE, OF DENVER, COLORADO.

AMUSEMENT DEVICE.

1,195,609. Specification of Letters Patent. Patented Aug. 22, 1916.

Application filed December 22, 1915. Serial No. 68,277.

*To all whom it may concern:*

Be it known that I, GEORGE H. RUMKE, a citizen of the United States, residing at Denver, in the county of Denver and State of Colorado, have invented certain new and useful Improvements in Amusement Devices, of which the following is a specification.

My invention relates to new and useful improvements in amusement devices of the class commonly known as motordromes, and its primary object resides in providing an apparatus of novel construction by the use of which the driver of a motor vehicle or the rider of a bicycle may provide a novel entertainment without the hazards usually connected with exhibitions of this kind.

With the above objects in view, my invention comprises a motordrome having a spherically concave, smooth and unbroken riding surface, and an opening through which said surface may be observed from an exterior point.

The motordrome is made of sufficient strength to withstand the centrifugal force of a vehicle moving upon its concave surface and it is mounted in a structure which includes a platform from which the spectators may look through its opening into its interior.

My improved motordrome in its simplest form comprises a rigidly mounted, bowl-shaped element the interior surface of which is hemispheric. The surface of the bowl is continued at its rim to provide a track in the plane of the secondary great circle of the sphere of which it forms part and the platform is built sufficiently high to permit the spectator to look into the opening of the bowl. The driver or rider of a vehicle entering the motordrome through a door in the lower portion thereof, commences to ride along a spiral course, gradually increasing the speed of the vehicle while mounting to the plane of the equatorial circle of the riding surface adjacent the rim of the bowl-shaped structure at which point he may continue to drive in a horizontal plane in full view of the spectators occupying the platform. In addition to the hemispheric riding surface, a bridging track or runway formed in the sphere of which said surface is part, and connected at opposite sides thereof, may be provided to permit the rider to drive the vehicle in a circular course traversing the plane of the secondary or horizontal great circle of the sphere. The runway may slant from the perpendicular, or it may be placed in the plane of the vertical or primary great circle of the sphere, in which case the rider moves in a vertical plane and part of the time in an inverted position. In motordromes thus constructed, the rider after having reached the equatorial course by mounting spirally along the hemispheric riding surface, must turn the vehicle at an angle and move along a determinate course to enter upon the bridging runway, a performance which obviously requires more than ordinary skill and care. To obviate this somewhat objectionable feature of the apparatus without in any way detracting from its attractive characteristics, I provide in the preferred form of my invention, a riding surface which is entirely spherical, smooth and unbroken with the exception of the view-opening which is formed in its upper hemisphere. The driver or rider may in a motordrome of this construction, move spirally along arbitrary courses either to the track in the plane of the horizontal great circle of the sphere or to the runway in the vertical great circle of the same, or he may drive the vehicle in a plane obliquely traversing the equatorial plane, remaining constantly in full view of the spectators who look into the motordrome through the view-opening in the upper portion thereof.

Bars, netting or other protective means placed over the opening, prevent accidents to the spectators as well as to the driver of a vehicle moving upon the spherical surface, and lines or other designating marks painted or otherwise applied to the riding surface around the view opening and at other points, guide the driver of the vehicle so that he may avoid traversing the edges of the opening while circling the surface in courses to which the opening is opposite.

In the accompanying drawings, in the various views of which like parts are similarly designated, Figure 1 is a side elevation of my improved motordrome, in its preferred form, Fig. 2, a vertical section along the line 2—2, Fig. 1, Fig. 3, a similar section taken along the line 3—3, Fig. 1, Fig. 4, a sectional elevation of the motordrome in its simplest form, Fig. 5, a side elevation of a motordrome having an oblique runway bridging the hemispheric lower portion thereof, Fig. 6, a face view of the motordrome shown in Fig. 5, Fig. 7, a motordrome having a bridging runway in the plane of the great circle of the sphere of its riding surface, and Fig. 8, a section taken along the line 8—8, Fig. 1, looking in the direction of the arrow drawn across said line.

Referring first to Fig. 4 in which the simplest form of my invention is illustrated, the reference character 10 designates a concave bowl-shaped motordrome providing a hemispheric, smooth and unbroken riding surface 12. The motordrome has a door-closed opening 13 through which the vehicle enters and its interior surface is continued at its rim to provide the runway 14 in the plane of the horizontal great circle of the sphere of which it forms part.

The motordrome is made of material sufficiently strong to withstand the centrifugal force of a vehicle moving at great velocity upon its interior surface and it is mounted within a supporting structure 6 which is extended forwardly to provide a platform 7. A rail 8 separates the spectators occupying the platform from the view-opening of the motordrome, and seats 9 erected on the platform are arranged in tiers rising behind and above one another to accommodate a greater number of people.

The motordrome shown in Figs. 5 and 6, has an oblique runway 15 which bridges the interiorly hemispheric bowl and is formed in the sphere of which the surface of the bowl is part, and the motordrome illustrated in Fig. 7 differs from that shown in Fig. 5 only in that its runway is positioned in the primary great circle of the sphere of the hemispheric riding surface.

In the preferred form of my invention illustrated in Figs. 1, 2, 3 and 8, the spherical riding surface of the motordrome 2 is continued above the horizontal great circle thereof and is smooth and unbroken with the exception of the view-opening 4 which in this construction is formed in a quadrant of the sphere, the area of the opening being less than that of the quadrant to permit of the vehicle moving in the planes of the primary and secondary great circles of the sphere. Bars 5 placed across the opening 4 are provided to protect the spectators as well as to safeguard the driver of the vehicle, and designating marks such as a stripe 16 around the view opening and a circular stripe 17 in a plane obliquely opposite thereon, are painted or otherwise applied to the riding surface to guide the driver and designate the courses along which he can safely ride to reach the vertical runway without traversing the edges of the view-opening.

Having thus described my invention what I claim and desire to secure by Letters-Patent is:

1. A motordrome comprising a concave hemispheric smooth and unbroken riding surface and a runway formed above and continuous with said surface in the sphere of which it is part.

2. A motordrome comprising a concave hemispheric smooth and unbroken riding surface and a runway formed above and continuous with said surface in the plane of a great circle of the sphere of which it is part.

3. A motordrome comprising a concave hemispheric smooth and unbroken riding-surface continued at its edge to provide a runway in a great circle of the sphere of which it is a part and a runway formed in the same sphere above and continuous with said surface.

4. A motordrome comprising a concave hemispheric smooth and unbroken riding-surface continued at its edge to provide a runway in a great circle of the sphere of which it is a part and a runway formed in the plane of another great circle of the same sphere above and continuous with said surface.

5. A motordrome comprising an element having interiorly a spherical, smooth and unbroken riding surface, in the upper hemisphere of the surface a view-opening through which said surface may be observed from an exterior point, and guide marks upon said surface to direct a rider along courses avoiding said opening.

6. A motordrome comprising an element having interiorly a spherical, smooth and unbroken riding-surface, and a view-opening through which said surface may be observed from an exterior point, and protective means across said opening.

7. A motordrome comprising an element having interiorly a spherical riding surface and within a quadrant of its said surface in the upper hemisphere of the same, a view-opening through which said surface may be observed from an exterior point.

In testimony whereof I have affixed my signature in presence of two witnesses.

GEORGE H. RUMKE.

Witnesses:
 D. J. ROLLANDET,
 L. RHOADES.

Copies of this patent may be obtained for five cents each, by addressing the "Commissioner of Patents, Washington, D. C."